United States Patent [19]

Prengemann

[11] 3,767,048
[45] Oct. 23, 1973

[54] METHOD AND APPARATUS FOR FILTERING LIQUID

[75] Inventor: Heinz Prengemann, Michelbach, Germany

[73] Assignee: Passavant-Werke, Michelbacher Hutte, Germany

[22] Filed: Aug. 20, 1971

[21] Appl. No.: 173,466

[30] Foreign Application Priority Data
Aug. 26, 1970 Germany............... P 20 42 353.4

[52] U.S. Cl................ 210/77, 210/189, 210/195, 210/268
[51] Int. Cl................... B01d 33/00, B01d 33/30
[58] Field of Search.............. 210/33, 189, 268, 210/415

[56] References Cited
UNITED STATES PATENTS

| 2,073,388 | 3/1937 | Elliott et al. | 210/268 |
| 2,780,310 | 2/1957 | Schaub | 210/268 X |
| 2,742,381 | 4/1956 | Weiss et al. | 210/268 X |
| 3,003,641 | 10/1961 | Laughlin | 210/189 |
| 3,176,606 | 4/1965 | Zoffmann | 210/415 X |
| 329,185 | 10/1885 | Matthiessen | 210/268 |
| 335,586 | 2/1886 | Howes | 210/268 |
| 2,057,887 | 10/1936 | Elliott et al. | 210/268 X |

Primary Examiner—Samih N. Zaharna
Assistant Examiner—Robert H. Spitzer
Attorney—Larson, Taylor & Hinds

[57] ABSTRACT

A method and apparatus for filtering liquids in which the liquid to be filtered is passed upwardly through a downwardly moving filter bed of granular filter material. The effective cross-section of the filter bed bottom is increased by forming up into this bottom a cavity into which the liquid is introduced for passage through the bed, and through which the lowermost granular filter material of the bed is removed. The cavity may be formed structurally with fixed, annular, conically arranged supports between which the granular filter material and the liquid pass downwardly and upwardly, respectively.

22 Claims, 2 Drawing Figures

PATENTED OCT 23 1973          3,767,048
FIG. 1
FIG. 2
INVENTOR
HEINZ PRENGEMANN
Larson, Taylor and Hinds
ATTORNEYS
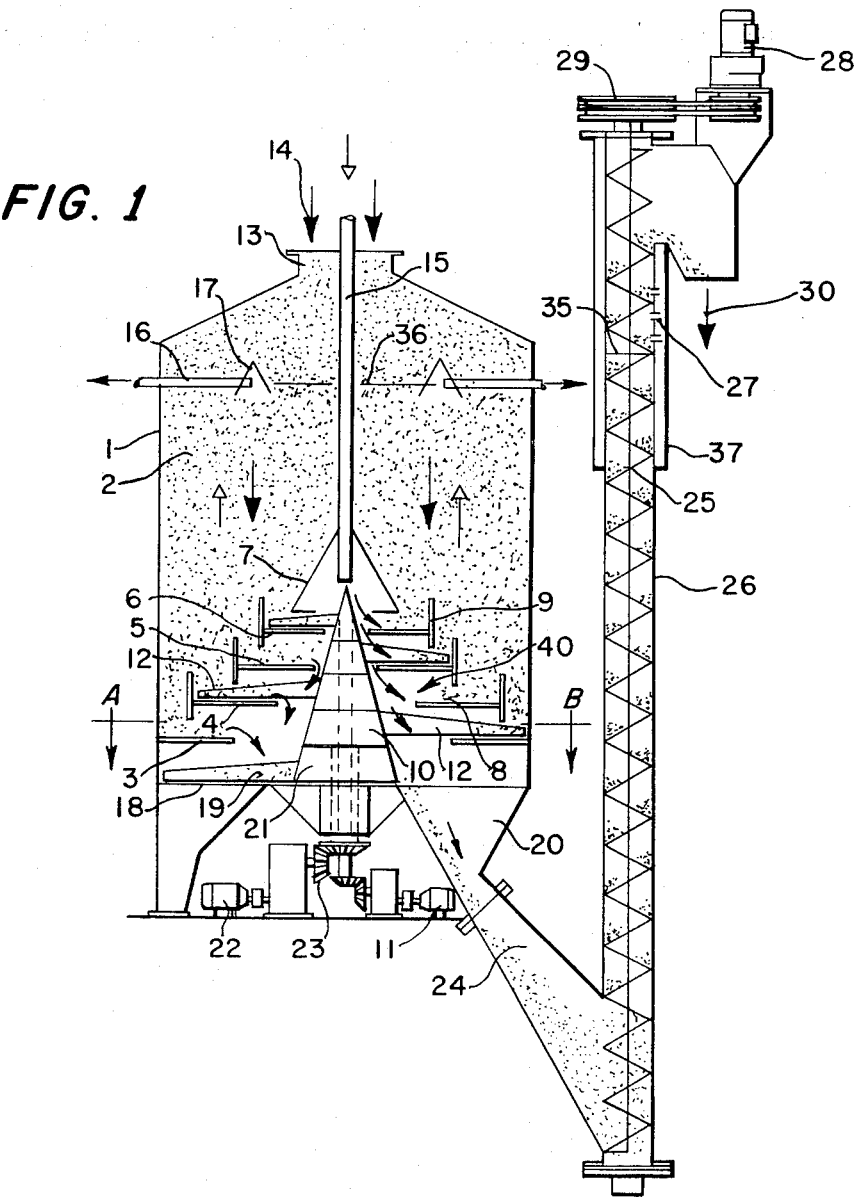
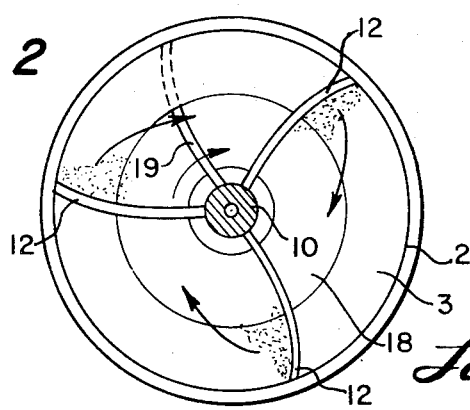

METHOD AND APPARATUS FOR FILTERING LIQUID

BACKGROUND OF THE INVENTION

This invention relates to the filtration of liquids, and in particular it relates to a filtration method and apparatus in which the liquid is passed upwardly through a downwardly moving bed of granular filter material.

In filter beds composed of granular filter material either of the type having a purely mechanical filtering action (sand, gravel, slag) or of the type having an additional absorptive capacity binding dissolved pollutants (activated carbon, silicagel crystals, etc.), the surface of the filter bed through which the liquid initially passes is the first to become obstructed with pollutants which must therefore be renewed much earlier than the rest of the filter material. In view of this difficulty, it is known to mount a filter bed of the above described type on a supporting frame equipped with a scraper wherein the liquid is introduced from below and the scraper either constantly or intermittently removes the lowest polluted filter layer. At the same time, fresh or preferably used and regenerated granular filtering material is filled in on the top of the filter bed.

The filtering efficiency of such known apparatus is based essentially on the effective cross-section of the filter bed and can therefore be increased only by increasing the overall dimensions of the apparatus, particularly of the filter bed. Enlarging the apparatus would involve considerable additional cost. There thus exists a need for increasing the overall filtering efficiency of a filtering apparatus of the type described without necessarily increasing the costs thereof.

SUMMARY OF THE INVENTION

Thus, it is a purpose of the present invention to improve liquid filtration of the type in which the liquid passes upwardly through a downwardly moving bed of granular filter material by providing a method and an apparatus for increasing the filtering capacity without increasing the overall dimensions and hence the cost of the apparatus.

This invention is based on the premise that the filtering capacity of the plant depends primarily on the respective cross-section and on the degree of pollution of the lowermost filtering layer of the bed which is in immediate contact with the incoming liquid. It is therefore the object of the invention to provide as large an effective cross-section as possible, while on the other hand delaying the pollution of the lowermost filtering area as much as possible.

In accordance with the present invention, a cavity is formed into the bottom of the filter bed with the lowermost granular filter material forming, at least in part, the lateral walls of this cavity. The bottom of the cavity is open. The liquid to be filtered enters this cavity and moves through its walls into the filter bed while the filter material forming the walls are removed through this cavity, downwardly through the open bottom thereof.

The walls of the cavity thus offer a larger surface through which the liquid can penetrate as compared with a filter bed having the same overall transverse cross-section but a generally flat bottom without a cavity formed therein. The filtering capacity of the apparatus can therefore be increased while its overall dimensions remain the same. Further, the velocity of the liquid passing through the lowermost filtering layer is reduced, thus reducing the pollution per unit area of this filtering layer. Moreover, the hollow space of the cavity serves as a settling chamber where suspended solids included in the introduced liquid can settle out by gravity and not add to the pollution of the filtering layer in immediate contact with the liquid. Settling therefore takes place without requiring a separate space for it, such as an additional primary sedimentation tank.

The hollow space is preferably cone-shaped. A plain scraper disc of the prior art can be replaced for example by a cone-shaped scraping device which at the same time forms the walls of the cavity.

However, in a preferred embodiment of the invention the hollow cavity is formed by a plurality of generally annular vertically spaced supports together with the granular filtering material occupying the spaces between these supports. In this manner, the polluted filtering material can easily be removed without the pressure of the entire filter bed pressing down from above. A particular advantage of this arrangement is that with this construction of the cavity a much larger surface area is provided to be penetrated by the liquid even if the liquid enters the granular filter material only in the spaces between the supports. However, this can be further improved by constructing the supports as perforated members so that the liquids can also pass therethrough. The supports are annular elements arranged concentrically one above another, their internal and external diameters decreasing upwardly so that the entire cavity beneath the supports is conical in shape. The supports are preferably supported one above the other by radial ribs and/or attached to the housing of the filter bed. On the outside, the supports preferably have flange-like rims arranged vertically and extending around the periphery of the supports. With this arrangement the slowly moving granular filtering material can be evenly distributed to all of the supports. The liquid is introduced to the top of the cavity, preferably from above, and this liquid which initially flows downwardly and then outwardly in a radial direction is then deflected by the flange-like rim upwardly while its velocity is increased. This provides a certain amount of turbulence, thus causing a thorough mixing of the granular filtering material so as to avoid the formation therein of channels through which the upwardly flowing liquid might otherwise pass unfiltered.

The arrangement for removing the polluted filter material preferably comprises scraper arms which are movable over the supporting structures while clearing them of the lowermost filtering layer. If the supports are annular and arranged concentrically, the scraper arm can be mounted to a central drive shaft within the cavity and hence engaging the supporting structures from within.

The above described advantages of the present invention with respect to the settling of solid materials results from the fact that the liquid to be filtered, on entering the hollow cavity through the inlet pipe slows down and penetrates into the filter bed with decreased velocity and less turbulence, so that larger particles may settle out and fall downwardly through the open bottom. To further increase this effect, the inlet pipe through which the liquid enters should be located in the upper part of the cavity so that the liquid, which initially descends, is only gradually deflected towards the walls of the cavity to enter the filtering material. Settling is thus encouraged by this decending flow. In addition, flow deflecting devices can be installed inside of the cavity which will serve to calm and stabilize the flow. The drive shaft of the scrapers located within the hollow cavity can be formed as a cone with its lower end open and the introduced liquid discharging onto the top of the cone. In this way the liquid at first descends and then flows radially towards the walls of the cavity.

Beneath the cavity, the housing of the apparatus preferably has formed therein a settling surface having an outlet for removal of settled solids and used filtering material. A scraping device can move these solids towards the outlet, but this scraping device should be operated independently of the scraper arms and should preferably be operated intermittently so as not to interfere with the general operation of the scraper arms with respect to the supports.

Once removed through the outlet, the mixture of settled solids and polluted filtering materials would be further conditioned. For example, the filtering material can either be cleaned and re-conditioned or else be suitably prepared for subsequent incineration, low-temperature carbonization, digestion, dressing, etc. In order to remove as much water as possible from the solids to be re-conditioned, the outlet is connected to conveying means suitable for partial de-watering of the removed solids. The conveyor preferably comprises a worm with a perforated surface.

Since the filtering apparatus, contrary to the prior art apparatus, also produces a certain cleaning effect as a result of sedimentation, suitable equipment should be provided for the addition of flocculants or similar substances immediately prior to the liquid entering the filter bed. Because of flocculants, even the dissolved pollutants will settle as flocs before the liquid enters the filter bed, so that no additional pollution load is created.

The clean filtrate is removed preferably through horizontal outlet pipes located on the surface or at the upper part of the filter bed. The inlet ends of these pipes are covered by small caps which are open at their bottom and which prevent filtering material from entering the pipes.

The invention also includes a method of filtering in which in a filtering apparatus of the type in which granular material passes downwardly through a housing while the liquid to be filtered passes upwardly the effective cross-sectional area of the bottom of the filter bed is enlarged, hence permitting an enlargement of the filtering capacity without increasing the overall dimensions of the apparatus, the method further including introducing the liquid to be filtered into the cavity and passing the same upwardly through the filter bed while concurrently removing used filter material downwardly through this cavity. In accordance with the method, the liquid may be introduced into the cavity so as to promote the removal therefrom of solid material even before this liquid enters the wall of the filter bed. Further, the used filter material may be removed intermittently thus creating a tubulence that will tend to loosen the entire filter bed, providing a uniform settling of the same and hence eliminating flow channels therethrough.

Thus, it is an object of this invention to provide a new and improved filtering method and apparatus.

It is another object of this invention to provide a new and improved filtering method and apparatus of the type wherein the liquid passes upwardly through a downwardly moving bed of filtering material in which the overall capacity is increased without increasing the overall dimensions of the filter.

It is another object of this invention to provide a new and improved filtering method and apparatus in which the liquid to be filtered moves upwardly through a downwardly moving bed of filtering material in which settling of solids from the incoming liquid is promoted before the liquid enters the filtering material.

It is another object of this invention to provide a new and improved method and apparatus of the type in which a liquid to be filtered passes upwardly through a downwardly moving bed of granular filter material in which a cavity is formed into the bottom of the filter bed, the liquid to be filtered enters this cavity and passes through its walls into the filter bed and upwardly therethrough and filter material forming the walls of this cavity are removed therethrough.

Other objects and advantages of the present invention will become apparent from the detailed description to follow, along with the accompanying drawings.

BRIEF SUMMARY OF THE DRAWINGS

There follows a detailed description of a preferred embodiment of the invention to be described with respect to the accompanying drawings in which:

FIG. 1 is a vertical sectional view through an apparatus constructed in accordance with the present invention.

FIG. 2 is a sectional view taken along line A–B of FIG. 1.

DETAILED DESCRIPTION OF THE PREFERRED EMBODIMENT

Referring now to the figures, like elements are represented by like numerals throughout the two views.

A housing 1 contains a filter bed 2 consisting of loose, fine, granular filtering material, preferably of uniform grain size. The filter material can consist e.g. of gravel, sand, or any material having an absorptive surface structure, such as activated carbon, low-temperature coke, etc. The filter bed 2 rests upon several annular supports 3, 4, 5, 6 spaced vertically above one another, the internal and external diameter of the supports decreasing towards the top. Between the individual supports and between the top support 6 and the tapered hood 7, the filtering material forms a sloped wall 8 of cavity 40. The supports 4, 5, 6 are fitted with flange-like peripheral vertical rims 9 to insure equal distribution of the filtering material to the individual supports. Whereas the lowermost support 3 is directly fastened to the housing 1, the upper supports 4, 5, 6 can be attached to the housing 1 by means of radial ribs and/or they can be fixed to the flange-like rims 9 of the supports underneath each of them.

The almost conical hollow cavity 40 is filled with the liquid to be filtered and is circumscribed by supports 3, 4, 5, 6, the sloped walls 8 formed by the filtering material and the tapered hood 7. Extending into this hollow space is a conical drive shaft 10 driven by a motor 11 and carrying radially arranged, curved scraper arms 12 engaging the supports to remove the polluted filtering material on the inside, so that the material drops from the inner edge of each support. The scraper arms 12 may be operated either continually or intermittently, as required. The removed filtering material is replaced by a fresh supply gradually descending from the top as the supports are scraped. As indicated by arrows 14, the filter bed material 2 is constantly replenished through an opening 13 at the top (this is done by conveying means not shown). The material may either be fresh and/or used and cleaned or re-conditioned.

The filter bed moves from the top to the bottom of the housing 1. The liquid to be cleaned flows in the opposite direction, i.e. rising from the bottom to the top of the filter bed. The liquid is introduced through pipe 15 extending into the conical hood 7 and hence into the top part of the hollow space formed by the hood 7, the supports and the sloped walls of the filtering material. The flow descends vertically towards the conical drive shaft 10 which, by virtue of its conical shape, deflects the flow of the liquid radially outward towards the sloped walls of filtering material between the various supports. The heavier settleable solids in the liquid sink due to their own gravity or due to the kinetic energy of the flow on entering the plant. The liquid which enters the walls 8 of the filter bed no longer contains settleable solids that could add to the pollution load of the filter bed. The liquid now rises through the filter bed 2 and is removed via outlet pipes 16, the intake ends of which are covered by caps 17 open at the bottom to prevent filtering material from entering the outlet pipes. The liquid can be fed in and/or removed by means of hydrostatic pressure or by pumps (not shown).

The settled solids and the filtering material removed from the supports by scrapers 12 collect on a horizontal settling surface 18, forming the bottom of the tank. From here they can be removed by means of a scraping device 19, into an outlet hopper 20. The scraping device 19 is connected to a separate drive shaft 21 which is driven by a motor 22 via a bevel gear 23 independently of the scraper arms 12. The shape of the drive shaft 21 is that of a truncated cone arranged as an extension of the cone-shaped shaft 10. The scraping device 19 is moved only intermittently and much less than the scraper arms 12, so as to avoid unnecessary interruption of the settling process.

The solids in the hopper 20 are discharged through a connecting pipe 24 into a pipe 26 having a vertical worm conveyor 25 which lifts the material up to a certain level 35 exceeding the water level 36 in the filter housing 1. Above this liquid level, the pipe 26 housing the worm conveyor 25 is perforated — as indicated by 27 and surrounded by a non-perforated outer housing 37. If necessary, the worm conveyor can be perforated, too, so as to permit the water to run off, whereby the material is partially dewatered. The worm can be driven by means of a motor 28 via a belt transmission 29; the partially dewatered material being discharged at 30 and consisting of filtering material and polluted matter is now ready for subsequent treatment. It can then be mixed with other waste material or pressed into cakes for incineration or low-temperature carburization. It may also be digested or otherwise conditioned, as the case may be.

Flocculant aids can be added to the incoming liquid through a charging or dosing device (not shown) preferably extending into pipe 15 or into the hood 7, so as to encourage dissolved or emulsified pollutants to coagulate and to change them into settleable flocs.

The apparatus represents a compact plant combining in a single unit several treatment procedures which heretofore, have required separate equipment. Firstly, pollutants are encouraged to settle and, if flocculant aid is added, to coagulate; secondly, they are filtered and adsorbed. It is a particular advantage that the flow of liquid is slowed down and calmed on emerging from the pipe 15 and before entering the filter bed 2. On the other hand, if necessary, the intermittent introduction of liquid can be used to produce a turbulence that loosens the filter bed 2.

The sloped walls formed by the filtering material between the supports 3,4, 5,6 are largely relieved of the pressure due to the weight of the filter bed bearing on them and can, therefore, easily be scraped by the scraping arms. The scraped off material is intensively mixed with the liquid flowing in the opposite direction, so that some of the polluted particles sticking to the material are washed off again. This facilitates subsequent reconditioning of the filter material.

The apparatus is not limited to the details of the embodiment shown herein. For example, the number of supports can vary, and it is not absolutely necessary for the diameter of the supports to gradually diminish towards the top. The supports can be perforated so the liquid may penetrate into the filter bed not only through the sloped walls 8 but also through the supports. The perforations should be smaller than the grains of the filtering material. Those skilled in the art may use other or similar means for the introduction of the liquid into the hollow cavity as well as for the removal and dewatering of the solids.

The method of operation of the invention will be apparent from the preceding description of the apparatus. However, for convenience, the method of operation will be briefly summarized. Granular filtering material is placed into the housing 1 to a suitable level after which liquid to be filtered is introduced through the pipe 15. This liquid enters the generally conical cavity in the vicinity of tapered hood 7. The initial movement of the liquid is therefore downwardly. Moreover, since the liquid is made to turn radially outwardly, it becomes somewhat calm. Because of this movement, solid particles contained in this liquid fall downwardly both under the influence of gravity and kinetic energy. It will kept in mind that the entire cavity is filled with water down through the outlet 20, the pipe 24 and up through the pipe 26 to the level 35 which is just above the level 36 of the liquid in the housing 1. Thus, this liquid entering the cavity 40 will tend to seek its own level which means upward movement through the filter bed 2 to the liquid level 36 and hence outwardly through the pipes 16. Meanwhile, motor 11 will operate drive shaft 10 to turn the scraper blades 12 either constantly or intermittently, depending on the particular desired mode of operation. Similarly, the motor 22 will operate the shaft 21 via the bevel gear 23 to turn the scraping device 19 as desired to move settled solid materials from the surface 18 into the hopper 20.

Settled solids are then raised upwardly through the pipe 26 as the conveyor 25 is turned by a motor 28 via transmission belt 29. Liquid carried above the level 35 passes outwardly through the perforated part 27 of the pipe 26 and downwardly beneath the liquid level. Hence, solid particles carried above the level 35 are partially dewatered.

Although the invention has been described in considerable detail with respect to preferred embodiments thereof, it will be apparent that the invention is capable

I claim:

1. An apparatus for filtering liquids comprising:
a housing,
a filter bed of granular filtering material in the housing,
means for forming in the filter bed a cavity opened at the bottom and extending upwardly and inwardly from the lowermost level of the filter bed up into the same, the cavity reducing in cross-section as it extends upwardly with the granular filter material forming at least a part of the upwardly and inwardly extending wall of this cavity,
means for moving the granular filter material of the bed downwardly through the housing and for removing from the bed, through the cavity, the granular filter material forming the wall of the cavity,
means for introducing liquid to be filtered downwardly from above into said cavity such that the kinetic energy thereof causes at least some of any solid particles in the incoming liquid to continue to move downwardly through the open bottom of the cavity, and means for redirecting the liquid upwardly through the granular filter material forming the said wall of the cavity and up into and through the bed, and means for removing the filtered liquid from the bed at a given level which is above the cavity,
whereby that granular filter material which forms the said wall of the cavity and is therefore the part of the bed first contacted by the said liquid entering the bed, is removed from the bed through the cavity.

2. An apparatus according to claim 1, wherein the said cavity is generally conical.

3. An apparatus according to claim 2, wherein the said wall of the cavity is formed by a plurality of annular supports fixed relative to the housing and located one above the other and by the sloping walls of the granular filter material piled between the supports.

4. An apparatus according to claim 3, wherein the said supports are perforated.

5. An apparatus according to claim 3, wherein the said annular supports are arranged co-axially one above the other, their internal and external diameters diminishing towards the top.

6. An apparatus according to claim 3, wherein the supports are attached to said housing by bars extending from the supports to the housing.

7. An apparatus according to claim 3, wherein one of said supports is attached to the housing and the other said supports are attached to the said one support.

8. An apparatus according to claim 3, wherein each support is fitted with a vertically extending flange-like rim extending about its outer periphery.

9. An apparatus according to claim 8, including a drive shaft inside of the cavity and connected to the scraper blades to turn the same, said drive shaft being conical, narrowing upwardly, and wherein the means for introducing the liquid introduces the same above the drive shaft.

10. An apparatus according to claim 3, wherein the means for removing the granular filter material comprises scraper arms extending onto the supports for the cavity and movable around the supports.

11. An apparatus according to claim 1, wherein the means for introducing the liquid introduces the same into the top of the cavity.

12. An apparatus according to claim 11, including flow deflecting means inside the cavity for calming the liquid and uniformly distributing the liquid into the granular filter material of the filter bed forming the wall of the cavity.

13. An apparatus according to claim 1, including a settling surface formed at the lower part of the housing beneath the cavity, such that solid material falling from the cavity falls onto this settling surface, and an outlet opening formed in the settling surface and means for scraping solid material from the settling surface into the outlet opening.

14. An apparatus according to claim 13, wherein the means for removing granular filter material comprises scraper arms extending onto the supports from within the cavity, and including a drive shaft located inside the cavity and connected to said scraper blades to turn the same, and wherein said means for scraping solid material includes a further scraping device and including a second drive means located inside the cavity and operable independently of the said scraping blade driving means for driving the said scaping device of the settling surface.

15. An apparatus according to claim 14, wherein the drive shaft for the scraper blades of the supports is conical, narrowing upwardly, and said second drive means includes a drive shaft in the shape of a truncated cone forming a further downward extension of said conical drive shaft and wherein the means for introducing liquid introduces the same into the said cavity above the drive shaft.

16. An apparatus according to claim 13, said outlet being connected to a pipe which extends upwardly to hold liquid up to a height at least as great as the said given level of liquid in the filter bed.

17. An apparatus according to claim 16, said pipe including a conveyor which includes means for partially dewatering the removed solids.

18. An apparatus according to claim 17, the conveyor being a worm having a vertical axis with a perforated surface whereby the water can pass therethrough.

19. An apparatus according to claim 1, including at least one horizontal pipe located in the upper part of the filter bed for withdrawing filtrate liquid therefrom, the intake end of said pipe being covered by a cap open at its lower end.

20. A method of filtering liquid in a filter of the type wherein granular filter material forming a filter bed passes downwardly through a housing while the liquid to be filtered passes upwardly through the bed and is removed at the upper part of the housing, said method comprising the steps of: enlarging the effective cross-section of the open bottom of the filter bed relative to the cross-section of the bed taken in a horizontal plane passing therethrough by forming in the bottom of the filter bed a cavity which extends upwardly and inwardly thereinto reducing in cross-section upwardly and inwardly, with the granular filter material forming a part of the wall of the cavity, introducing the liquid to be filtered from above downwardly into the cavity such that the kinetic energy thereof causes at least some of any solid particles in the incoming liquid to continue to move downwardly through the open bottom of the cavity, and redirecting the liquid upwardly through the said cavity wall and up through the filter bed, and removing from the filter bed through the cavity and then through the open bottom granular filter material forming the said cavity wall.

21. The method of claim 20, wherein the cavity is generally conical and the liquid is introduced downwardly into the apex of the conical cavity.

22. The method of claim 20, including introducing the liquid to be treated intermittently.

* * * * *